No. 871,308. PATENTED NOV. 19, 1907.
W. VASSEL.
SURFACE COOLER.
APPLICATION FILED MAR. 22, 1906.
5 SHEETS—SHEET 3.
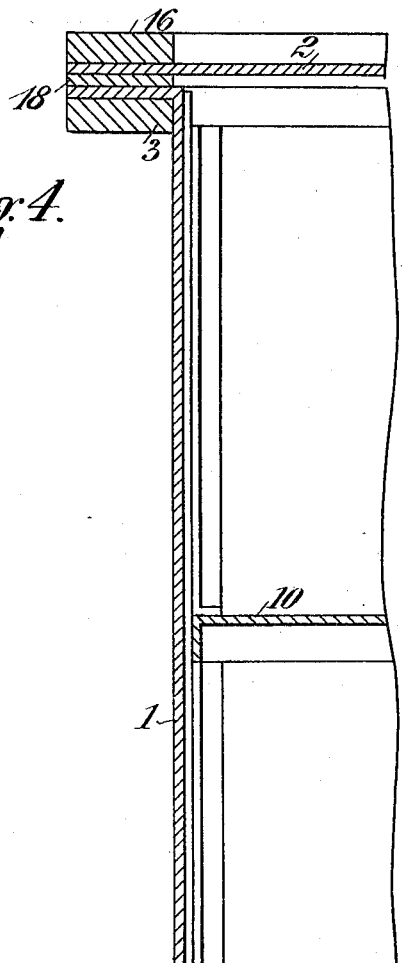
Fig. 4.
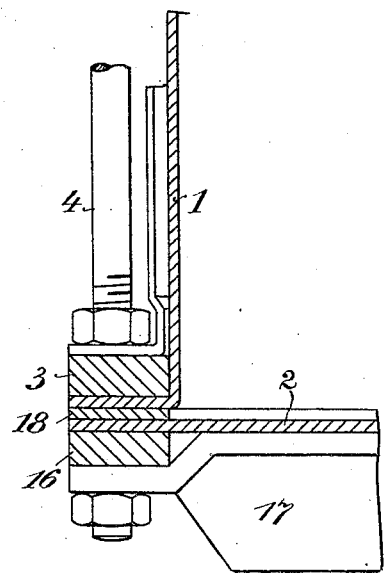
Fig. 3.
WITNESSES:
W. P. Burke
INVENTOR.
Walter Vassel
By Richardson
ATTYS.
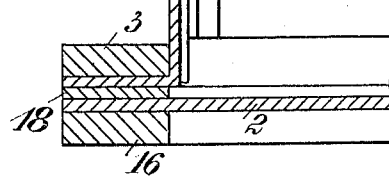

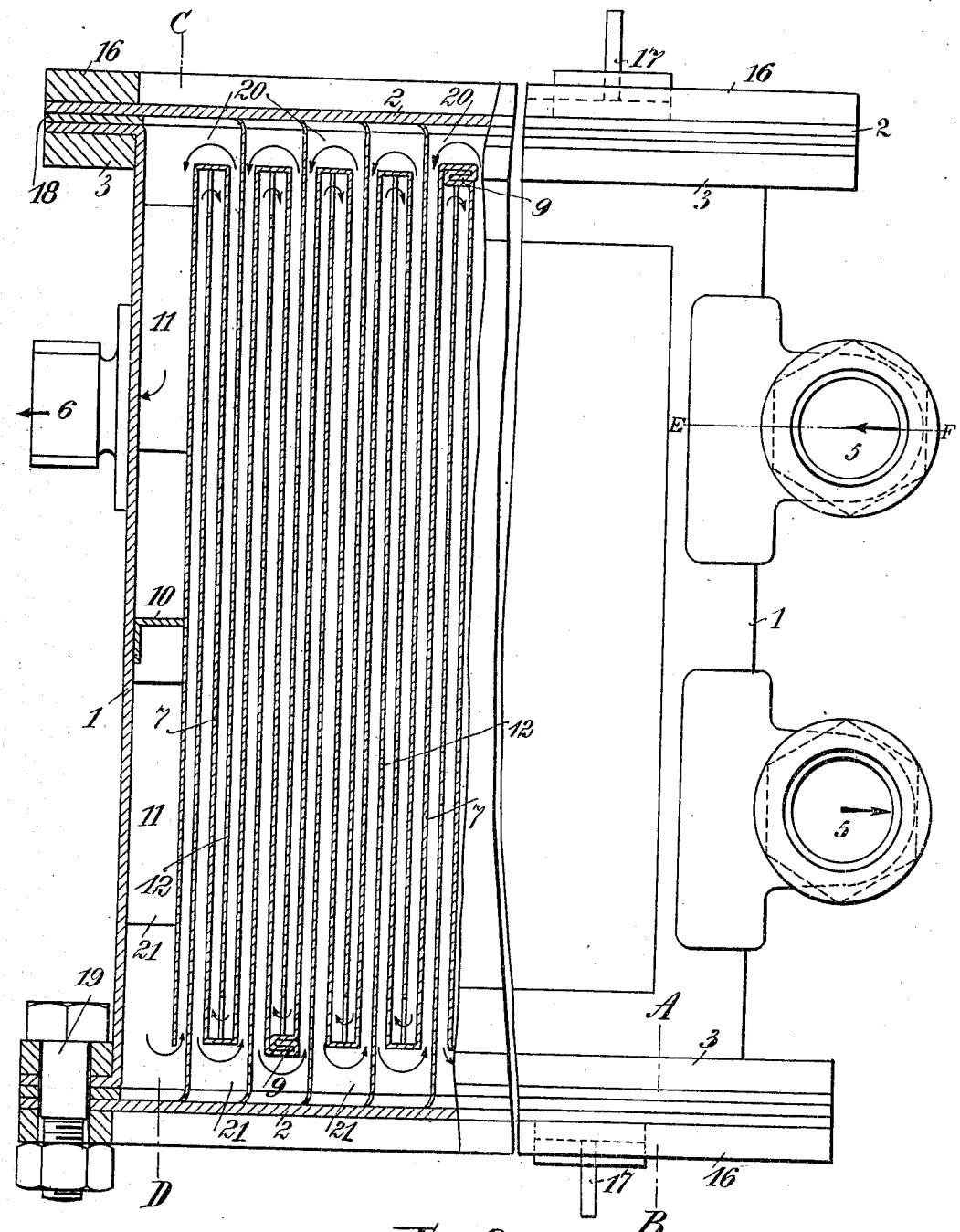

No. 871,308. PATENTED NOV. 19, 1907.
W. VASSEL.
SURFACE COOLER.
APPLICATION FILED MAR. 22, 1906.

5 SHEETS—SHEET 5.

WITNESSES
INVENTOR
Walter Vassel
Richards & Co.
ATT'YS.

UNITED STATES PATENT OFFICE.

WALTER VASSEL, OF CHARLOTTENBURG, GERMANY, ASSIGNOR TO THE FIRM OF RUD. A. HARTMANN, OF BERLIN, GERMANY.

SURFACE COOLER.

No. 871,308.     Specification of Letters Patent.     Patented Nov. 19, 1907.

Original application filed September 28, 1905, Serial No. 280,479. Divided and this application filed March 22, 1906.
Serial No. 307,531.

*To all whom it may concern:*

Be it known that I, WALTER VASSEL, a citizen of the Empire of Germany, residing at Charlottenburg, in the Empire of Germany, have invented a new and useful Surface Cooler, of which the following is a specification.

This application is a division of an application, #280479, filed by me Sept. 28/05.

My invention relates to improvements in surface coolers, whereby the cooling surface is considerably increased in proportion to the size of the cooler, so that the quantity of the cooling liquid is almost reduced to that of the liquid to be cooled.

The new surface cooler is more particularly intended for the use in a portable water purifier as described in my above mentioned application for a U. S. patent of the 28th September 1905, Serial No. 280,479, so that the consumption of combustible may be reduced to a minimum, since almost all the heat carried off with the palatable drinking-water can be recovered with the aid of the cooling impure water. The new surface cooler when applied to the portable water purifier is made so light, that the weight of the latter does not exceed the allowable maximum. This portable water purifier will be even enabled to use the very impure water as a cooling water and afterwards to turn it into palatable drinking-water, which is of special importance in countries, where water or combustible or both are rare or dear. The chief improvement of the surface cooler consists in its special construction, so that every particle of the impure cold water is obliged to thoroughly cool the hot sterilized water, while every particle of it is thoroughly heated.

I will now proceed to describe my invention with reference to the accompanying drawings, in which—

Figure 1:
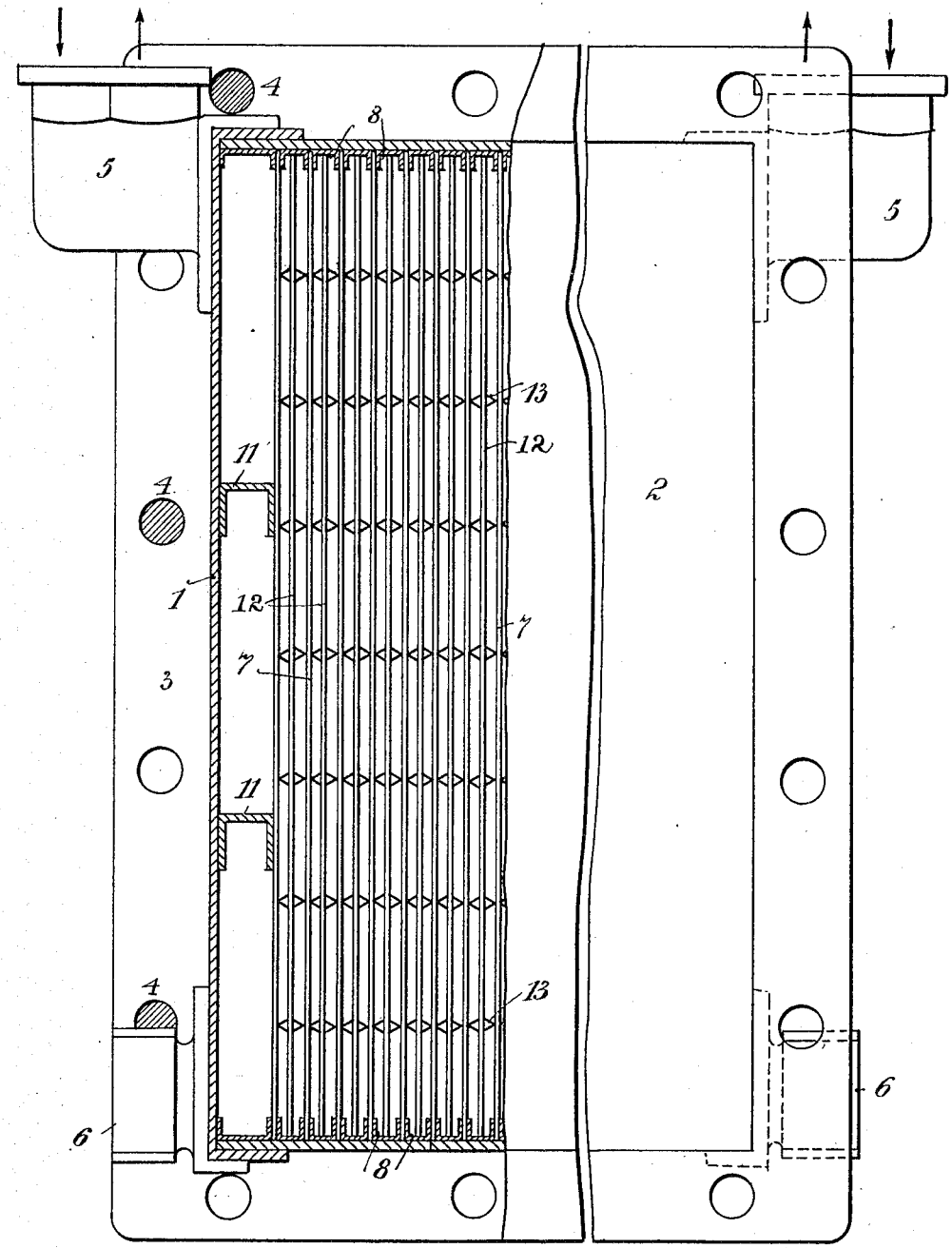
Figure 5:
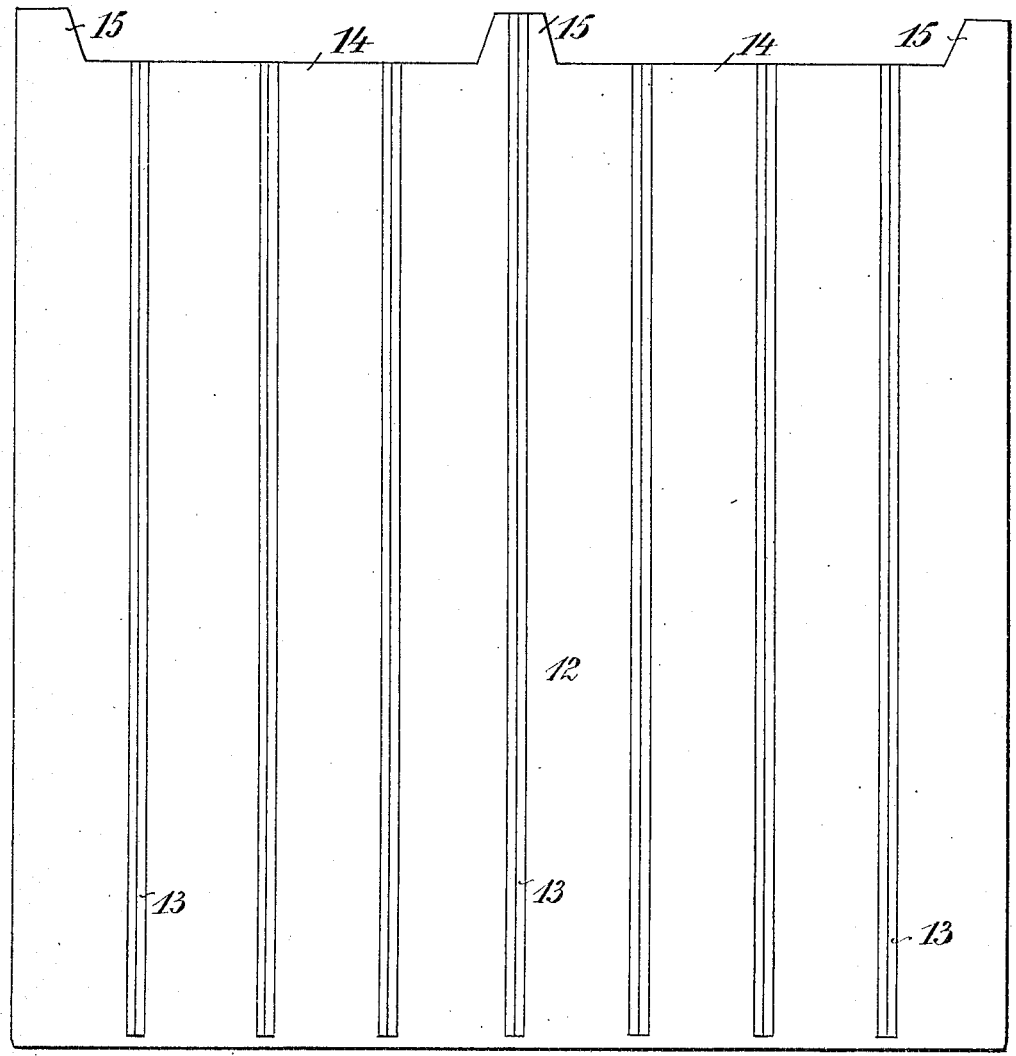
Figure 6:
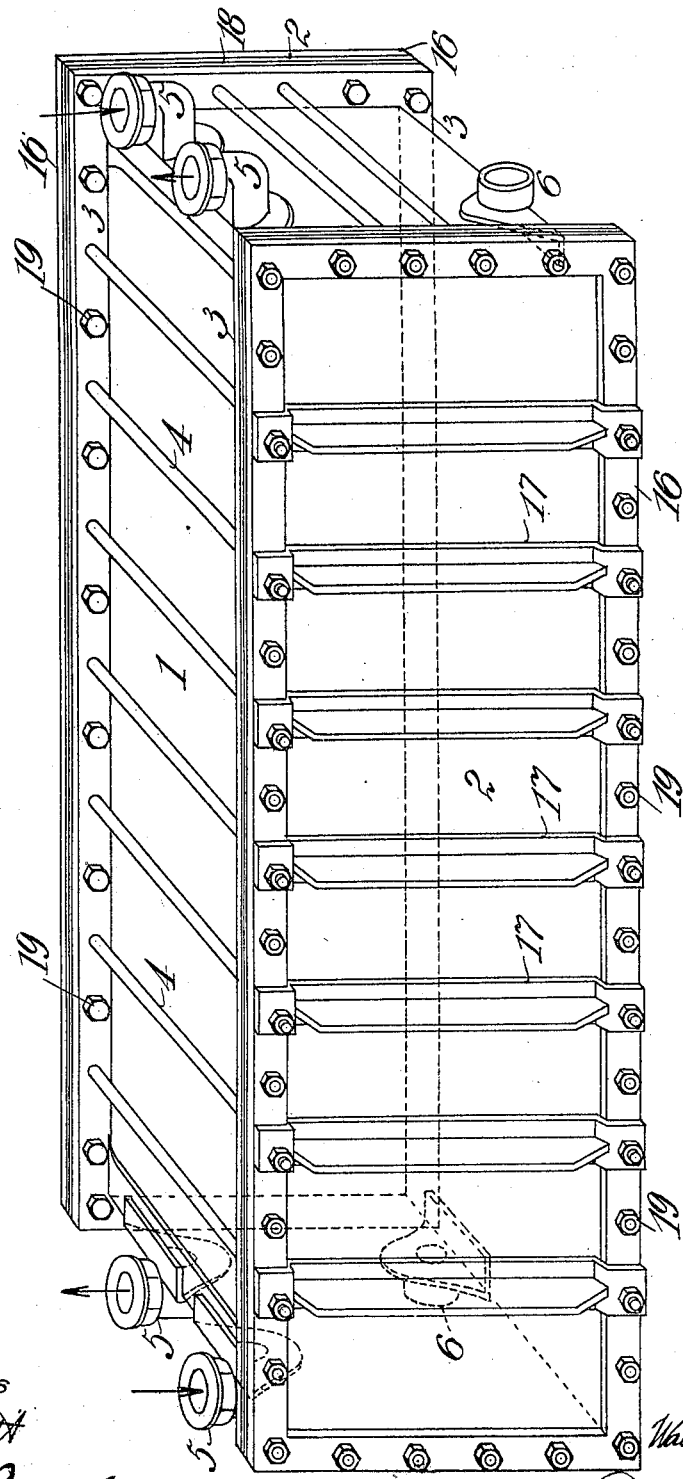

Figure 1 is an elevation of the new surface cooler, partly in section, an intermediate part being omitted, Fig. 2 is a plan of the same, partly in section, Fig. 3 is a vertical section through the line A—B in Fig. 2, Fig. 4 is a vertical section through the line C—D in Fig. 2 (seen in the direction from right to left), and Fig. 5 is an elevation of one of the partition plates in the surface cooler, and Fig. 6 is a perspective view o the surface cooler only the rear outlines being indicated by dotted lines, to show the general arrangement of the inlets and outlets Similar characters of reference refer to similar parts throughout the several views.

The surface cooler consists of a rectangular frame 1 and two covers 2, 2, which are all shown as made of sheet metal, so as to reduce the weight. The edges of the frame 1 on both sides are formed with flanges, which are stiffened with flat-iron borders 3, 3 and a convenient number of stays 4 (see Figs. 3 and 6). The frame 1 is placed vertically and is provided on the sides with four cast bends 5, 5 above and two cast connections 6, 6 below. In the four bends 5, 5 above (see Fig. 6) the ends of the respective tubes are to be fastened. To the two connections 6, 6 below outlet cocks or the like may be attached.

Within the frame 1 a thin sheet metal plate 7 is disposed, which is repeatedly bent in a zigzag line in a manner clearly shown at Fig. 2. The upper and lower edges of this sheet metal plate 7 are soldered on the internal faces of the frame 1 between distance pieces 8, 8. Should it not be possible to make in one piece the very long plate 7, which is preferably made of copper or a similar material, it may be made of several pieces which are united by folding and soldering, as is clearly shown at 9, 9 in Fig. 2. Between the two opposite sides of the frame 1 and the two end pieces of the plate 7 two vertical partitions 10, 10 (see Figs. 2 and 4) are secured by soldering or otherwise, which reach from the top down to the bottom and divide the end spaces into two compartments each. A convenient number of distance pieces 11, 11 of bent sheet metal is preferably disposed between the two opposite sides of the frame 1 and the end pieces of the plate 7.

From an examination of Fig. 2 it will be clear, that two series of water-tight pockets are formed on both sides of the frame 1 by the zigzag-plate 7, which pockets alternate with each other and face the two covers 2, 2 respectively. The edges of these pockets are at about the same distance from the two covers 2, 2, as the end pieces of the plate 7 from the sides of the frame 1. Into the several pockets a corresponding number of partition plates 12, 12 of the shape shown at Fig. 5 can be inserted. These plates 12, 12 are preferably made of thin sheet copper or of a similar material and have soldered on them on both sides a number of parallel horizontal distance pieces 13, 13, whereby they are held in the middles of the respective pockets. These distance pieces 13, 13 may be metal strips, which are bent longitudinally in the middle. The one side edge of each partition plate 12 is cut out at 14, 14, see Fig. 5, while the opposite side edge is slightly bent (see Fig. 2) and is arranged to bear against the respective cover 2. The three projections 15, 15 of the partition 12 are to bear on the bottom of the respective pocket, so that openings are formed by the cuts 14, 14, through which the water can pass from the one side of the partition 12 to the other side. The two covers 2, 2 are stiffened with flat-iron borders 16, 16 and a number of vertical T-iron bars 17, 17. Suitable packings 18, 18 are inserted between the flanges of the frame 1 and the covers 2, 2 and bolts and nuts 19, 19 are employed for tightening the surface cooler. It is to be noted, that the two covers 2, 2 should bear on the slightly bent edges of the partition plates 12, 12, so as to press their projections 15, 15 on the bottoms of the pockets and to prevent the water from passing along the covers. It is evident, that a very long and narrow passage in a serpentine line is thus formed for the impure water entering the cooler say through the right rear bend 5 in Fig. 6, and passing through the cooler in the direction of the arrows 20, 20, in Fig. 2, until it leaves the cooler through the left rear bend 5 in Fig. 6. A similar very long and narrow passage in a serpentine line is also formed for the hot sterilized water, which enters the cooler through the left front bend 5 in Fig. 6 and passes through the cooler in a direction opposite to that of the impure water, that is to say in the direction of the arrows 21, 21 in Fig. 2 until it leaves the cooler through the right front bend 5. As every pocket is again divided into two channels by the partition plate 12 it follows, that every particle of the impure water is guided in the prescribed manner and is prevented from mixing with other particles. The same is true of the hot sterilized water. Therefore the impure water is compelled to cool the hot sterilized water, with which it is in contact by means of the plate 7, uniformly at every step of its path and gradually in the direction of its path. The impure water enters in the cold state the cooler and leaves the same in a hot state, while the hot sterilized water entering the cooler at the opposite end leaves the cooler with a temperature, which is nearly equal to that of the cold impure water. The partition plates 12, 12 compel the cold impure water to take the prescribed long path, in order to take up nearly all the heat from the hot sterilized water, which latter is in a similar manner compelled to take its prescribed long path through the cooler, to insure the desired cooling effect.

The weight of the surface cooler can be made moderate by employing for the zigzag-plate 7 and the partition plates 12, 12 very thin sheet metal, such as copper or nickel, which may be made but a few tenths of a millimeter thick. In cases, where the weight of the cooler is of no importance, of course the frame 1 and the two covers 2, 2 may be made of a cheaper material, such as cast-iron or the like.

The cooler can be easily cleaned, as its two covers 2, 2 can be taken off and the several partition plates 12, 12 can be withdrawn. This is also a great advantage of the new surface cooler. The connections 6, 6 may be used for washing out the surface cooler, if so preferred, or they may be used for drawing off quantities or samples of the liquids. The surface cooler may be used for other purposes than portable water purifiers. Other liquids instead of water may be passed through the cooler.

The surface cooler may be varied in many respects without departing from the spirit of my invention.

What I claim as my invention, and desire to secure by Letters Patent, is—

1. A surface cooler having removable covers on both sides and comprising a plurality of parallel and narrow pockets placed side by side and of uniform width which alternately face the two covers respectively and are made of thin sheet metal, in combination with a plurality of ribbed partition plates of sheet metal cut out at the one edge and slightly bent at the opposite edge and adapted to be inserted in the several pockets of the said surface cooler to form two separate serpentine passages.

2. A surface cooler comprising a rectangular frame with two partitions ribs within and four tubular connections without on two opposite sides, removable covers on both sides of said rectangular frame, a thin sheet metal plate bent in a zigzag-line within said rectangular frame and secured with its edges on the other two opposite sides thereof, so that a plurality of parallel and narrow pockets of uniform width are formed, which alternately face the two covers, the end pieces of said zigzag sheet metal plate being secured on the partition ribs of said rectangular frame, in combination with a plurality of partition plates made of thin sheet metal, provided with a plurality of parallel ribs on both sides, cut out at the one edge and slightly bent at the opposite edge, these partition plates being adapted to be inserted in the alternating pockets to their bottoms and to bear with their bent edges on said two covers respectively, whereby two separate serpentine passages are formed in the surface cooler.

3. In a surface cooler, the combination with a vertical rectangular frame with two partition ribs within and four tubular connections without on two opposite sides, of removable covers on both sides of said vertical rectangular frame, a thin sheet metal plate bent in a zigzag-line within said vertical rectangular frame and secured with its edges on the upper and lower insides thereof, so that a plurality of parallel and narrow pockets of uniform width are formed, which alternately face said two covers, the end pieces of said zigzag sheet metal plate being secured on the partition ribs of said vertical rectangular frame, and a plurality of partition plates made of thin sheet metal, provided with a plurality of horizontal ribs on both sides, cut out at the one edge and slightly bent at the opposite edge, these partition plates being adapted to be inserted in the alternating pockets to their bottoms and to bear with their bent edges on said two covers respectively, whereby two separate serpentine passages are formed in the surface cooler.

In testimony whereof I have signed my name to this specification in the presence of two subscribing witnesses.

WALTER VASSEL.

Witnesses:
 WOLDEMAR HAUPT,
 HENRY HASPER.